(12) United States Patent
Lang et al.

(10) Patent No.: US 10,160,401 B2
(45) Date of Patent: Dec. 25, 2018

(54) PROVIDING A CONSTANT GAP WIDTH BETWEEN A SENSOR HEAD AND AN OPENING IN A SENSOR HOLDER OUTSIDE A VEHICLE

(71) Applicant: Mekra Lang GmbH & Co. KG, Ergersheim (DE)

(72) Inventors: Werner Lang, Ergersheim (DE); Elmar Finkenberger, Adelshofen (DE); Simon Deffner, Flachslanden (DE); Matthias Zink, Ohrenbach (DE)

(73) Assignee: Mekra Lang GmbH & Co. KG, Ergersheim (DE)

( * ) Notice: Subject to any disclaimer, the term of this patent is extended or adjusted under 35 U.S.C. 154(b) by 268 days.

(21) Appl. No.: 14/659,621

(22) Filed: Mar. 17, 2015

(65) Prior Publication Data

US 2015/0274091 A1 Oct. 1, 2015

(30) Foreign Application Priority Data

Mar. 25, 2014 (DE) .................. 10 2014 205 505

(51) Int. Cl.
*B60R 11/04* (2006.01)
*G01D 11/30* (2006.01)
(Continued)

(52) U.S. Cl.
CPC .............. *B60R 11/04* (2013.01); *B60R 21/01* (2013.01); *B60R 21/0134* (2013.01);
(Continued)

(58) Field of Classification Search
CPC ..... B60R 11/04; B60R 21/01; B60R 21/0134; B60R 21/34; B60R 2021/01006;
(Continued)

(56) References Cited

U.S. PATENT DOCUMENTS 6,318,774 B1 11/2001 Karr et al. .................... 293/117
6,463,818 B1 10/2002 Stagg et al. ................. 73/866.5
(Continued)

FOREIGN PATENT DOCUMENTS

AT 376804 B 12/1980
DE 7509304 U 3/1975
(Continued)

OTHER PUBLICATIONS

Office action dated Jul. 29, 2016 from the Japanese Patent Office in the related foreign application JP2015-054111 citing references C-E above (3 pages).
(Continued)

*Primary Examiner* — Yogesh K Aggarwal
(74) *Attorney, Agent, or Firm* — Imperium Patent Works; Darien K. Wallace (57) ABSTRACT

A device for monitoring vehicles surroundings includes a sensor, a sensor holder and a fastener. Due to manufacturing tolerances, the sensor axis that passes through the head of the sensor deviates from the axis of the sensor main body. The sensor head passes into an opening in the sensor holder centered around a sensor holding axis. When the sensor is mounted into a receiver niche in the sensor holder, the sensor holding axis and the sensor axis are aligned. The fastener fastens the sensor to the sensor holder and compensates for the sensor axis deviating from the main body axis. Screws pass through bore holes in the fastener and into screw holes in the sensor holder. The bore holes have a larger diameter than do the screw holes, allowing the sensor axis to be aligned with the sensor holding axis despite the sensor axis deviating from the main body axis.

18 Claims, 7 Drawing Sheets

(51) Int. Cl.
*G01S 7/521* (2006.01)
*B60R 21/01* (2006.01)
*B60R 21/0134* (2006.01)
*B60R 21/34* (2011.01)
*G01S 7/40* (2006.01)
*G01S 7/02* (2006.01)
*G01S 13/93* (2006.01)
*G01S 15/93* (2006.01)
*B60R 11/00* (2006.01)

(52) U.S. Cl.
CPC .............. *B60R 21/34* (2013.01); *G01D 11/30* (2013.01); *G01S 7/521* (2013.01); *B60R 2011/004* (2013.01); *B60R 2011/0066* (2013.01); *B60R 2011/0075* (2013.01); *B60R 2021/01006* (2013.01); *G01S 7/4026* (2013.01); *G01S 2007/027* (2013.01); *G01S 2013/9371* (2013.01); *G01S 2015/937* (2013.01)

(58) Field of Classification Search
CPC .. G01D 11/30; G01D 7/521; B06R 2011/004; B06R 2011/0066; B06R 2011/0075; G01S 7/4026; G01S 2007/027; G01S 2013/9371; G01S 2015/937
See application file for complete search history.

(56) References Cited

U.S. PATENT DOCUMENTS

| | | | | |
|---|---|---|---|---|
| 2003/0151266 A1* | 8/2003 | Moilanen | ................ | B25B 5/087 294/203 |
| 2003/0174053 A1 | 9/2003 | Rennick | ......................... | 340/435 |
| 2003/0214733 A1 | 11/2003 | Fujikawa et al. | ............ | 359/838 |
| 2011/0140606 A1* | 6/2011 | DeLine | .................. | B60K 35/00 315/82 |
| 2012/0272756 A1 | 11/2012 | Pfauch et al. | ............... | 73/866.5 |
| 2013/0047740 A1 | 2/2013 | Knoll | .............................. | 73/756 |
| 2015/0160536 A1* | 6/2015 | Lang | .................... | H04N 5/2251 348/374 |
| 2015/0168813 A1* | 6/2015 | Lang | ...................... | G03B 17/08 348/148 |

FOREIGN PATENT DOCUMENTS

| | | |
|---|---|---|
| DE | 8815130 U1 | 12/1988 |
| DE | 19752921 A1 | 11/1997 |
| DE | 60301046 T2 | 12/2003 |
| DE | 602005002859 T | 3/2005 |
| DE | 602005002859 T2 | 3/2005 |
| DE | 202008007404 U1 | 6/2008 |
| DE | 102008054000 A1 | 10/2008 |
| DE | 102009028662 A1 | 8/2009 |
| DE | 102009028663 A1 | 8/2009 |
| DE | 102010062772 A1 | 12/2010 |
| DE | 202010016488 U1 | 12/2010 |
| DE | 102011017535 A1 | 4/2011 |
| DE | 102011075698 A1 | 5/2011 |
| DE | 102013000204 A1 | 1/2013 |
| EP | 2015079 A1 | 5/2008 |
| EP | 2136192 A1 | 6/2008 |
| GB | 2450710 A | 7/2007 |
| JP | 2001208763 A | 6/2000 |
| JP | 2003-327048 A | 5/2002 |
| JP | 2009-012751 A | 7/2007 |
| JP | 4056568 B | 12/2007 |
| WO | WO2009/144545 A1 | 12/2009 |

OTHER PUBLICATIONS

English translation of the Jul. 29, 2016 Office action from the Japanese Patent Office in JP2015-054111 listed in G above. (4 pages).

Search report dated Feb. 26, 2015, from the German Patent Office in the related foreign application DE102014205505.9 citing the 14 references above (8 pages).

Extended European Search Report dated Nov. 18, 2015, from the European Patent Office in the related European application EP15160357.8 citing references A-C (7 pages).

Office action dated Jan. 15, 2018 from the German Patent Office in the related German application DE102014205505.9 citing references A and D-T above (7 pages).

English translation of the Jan. 15, 2018 Office action from the German Patent Office in DE102014205505.9 listed in S above. (3 pages).

* cited by examiner (PRIOR ART)
FIG. 1

PROVIDING A CONSTANT GAP WIDTH BETWEEN A SENSOR HEAD AND AN OPENING IN A SENSOR HOLDER OUTSIDE A VEHICLE

CROSS REFERENCE TO RELATED APPLICATION

This application is based on and hereby claims the benefit under 35 U.S.C. § 119 from German Patent Application No. DE 102014205505.9, filed on Mar. 25, 2014, in the German Patent Office. This application is a continuation-in-part of German Patent Application No. DE 102014205505.9, the contents of which are incorporated herein by reference.

TECHNICAL FIELD

The invention relates to a sensor arrangement for monitoring a vehicle's surroundings, and in particular to sensors that are attached outside of the vehicle.

BACKGROUND

In motor vehicles, sensors of the widest variety are continually used for monitoring a vehicle's surroundings. Ultrasound sensors are used for parking assistance systems, radar sensors for distance monitoring systems, cameras for indirect viewing systems and thermal imaging cameras for detecting persons in the vicinity of the vehicle.

Figure 1:
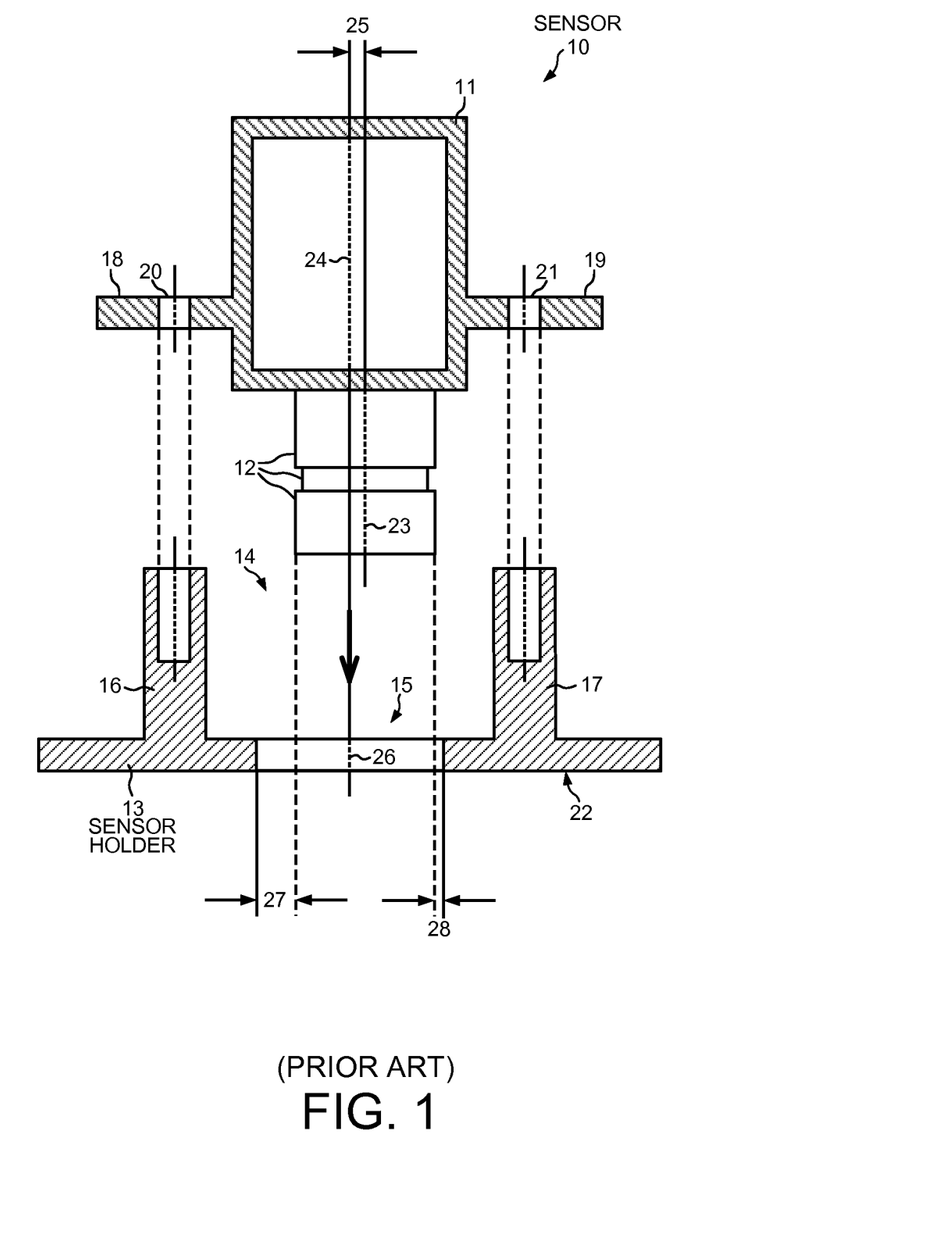
FIG. 1 (prior art) is a schematic diagram of a sensor arrangement according to the prior art.

FIG. 1 (prior art) shows a sensor 10 that includes a sensor main body 11 from which a sensor head 12 protrudes. The sensor 10 is held in a sensor holder 13. The sensor holder 13 includes a sensor head receiver niche 14 with a sensor head opening 15 and two screw receivers 16 and 17 that extend on the left and on the right of the sensor head opening 15 in a direction parallel to the sensor main body 11. The sensor main body 11 includes two fastening clips 18 and 19 with screw holes 20, 21 located on the left and right away from the sensor main body 11. The sensor 10 is inserted into the sensor holder 13, and the two fastening clips 18 and 19 come to rest on the upper ends of the two screw receivers 16 and 17. Sensor 10 and sensor holder 13 are screwed together using screws that are not shown in FIG. 1. The height of the two screw receivers 16 and 17 is selected so that the sensor head 12 is aligned with the outside surface 22 of the sensor holder 13.

The sensor 10 is oriented along a sensor axis 23. The sensor main body 11 has a main body center axis 24 that deviates from the sensor axis 23 due to a manufacturing tolerance 25. The sensor head receiver niche 14 and the sensor head opening 15 have a sensor holding axis 26 that passes through the center of the opening 15. Because the sensor 10 is mounted by the fastening clips 18 and 19 arranged symmetrically on the sensor holder 13 relative to the sensor main body 11, the manufacturing tolerance 25 between sensor axis 23 and main body center axis 24 must be taken into consideration in the dimensioning the sensor head opening 15. Therefore, in the assembled state of sensor 10 and sensor holder 13, gap widths varying between 27 and 28 result between the margin of the sensor head opening 15 and the sensor head 12. These gap widths varying between 27 and 28 lead to a visually unsatisfactory result because the human eye is sensitive to such variations in gap width.

A sensor arrangement is sought that improves upon the current manner in which the heads of sensors and cameras protrude from sensor holders outside of vehicles so as to avoid any large variation in the gap width between the sensor head and the opening in the sensor holder.

SUMMARY

A sensor arrangement is provided, in particular for sensors to be attached outside of a motor vehicle, for monitoring the vehicle surroundings. Small manufacturing tolerances between the sensor head and the sensor main body can lead to unequal gap widths. Because the sensor head receiver niche is designed so that, in the mounted state of the sensor in the sensor holder, the sensor holding axis and the sensor axis are aligned, the result is a joint gap with constant gap width between the margin of the sensor head opening and the sensor head. The gap width variations that are perceived as visually unappealing are thus prevented, and the visual quality of the component group is increased. The constant gap width also decreases wind noises and soiling in the interior area. In spite of the constant gap width, the mounting of the sensor in the sensor holder does not become more difficult. The outside surface of the sensor holder is preferably designed as a visible component. Alternatively, an additional transparent cover is also possible.

In one embodiment, a device for monitoring the surroundings of motor vehicles includes a sensor, a sensor holder and a fastener. The sensor includes a sensor main body and a sensor head. The sensor axis passes through the center of the sensor head, and the main body center axis passes through the center of the sensor main body. Due to manufacturing tolerances, the sensor axis deviates from the main body center axis. The sensor holder includes a sensor head receiver niche and a sensor head opening into which the sensor head is received. The sensor holding axis passes through the center of the sensor head opening. The sensor head receiver niche is formed so that when the sensor is mounted in the sensor holder, the sensor holding axis and the sensor axis are aligned. The fastener fastens the sensor to the sensor holder and compensates for the sensor axis deviating from the main body central axis. Aligning the sensor axis of the sensor head with the sensor holding axis of the opening achieves a constant gap width between the sensor head and the edge of the sensor head opening. This avoids gap width variations that are visually unappealing.

In one aspect, the fastener includes bore holes in holding clips attached to the sensor. Screws pass through the bore holes and into screw holes in the sensor holder. The bore holes have a larger diameter than do the screw holes, which allows the sensor axis to be aligned with the sensor holding axis despite the sensor axis deviating from the main body center axis. In another aspect, the sensor head includes a sensor head collar that rests on the sensor holder so as to align the sensor axis with the sensor holding axis. The sensor head collar has an annular ridge that fits in an annular groove in the sensor holder. In yet another aspect, the sensor and the sensor holder are integrated into a holding arm that is attached to the vehicle. The sensor holder is attached to the holding arm by an annular collar of the sensor holder that mates with a complementary annular step of the holding arm. A flexible heating foil is wrapped around the sensor head inside the holding arm.

In another embodiment, a sensor arrangement on a vehicle includes a sensor, a sensor holder and a fastener. The sensor includes a sensor main body and a cylindrical sensor head. The sensor axis passes through the center of the sensor head, and the main body center axis passes through the center of the sensor main body. The sensor axis deviates from the main body center axis due to manufacturing tolerances. A sensor holder includes a circular sensor head opening into which the sensor head passes. The sensor holding axis passes through the center of the sensor head opening. The fastener attaches the sensor to the sensor holder such that the sensor holding axis and the sensor axis are aligned. The fastener compensates for the sensor axis deviating from the main body central axis by centering the sensor head in the sensor head opening. The sensor is a thermal imaging camera, an infrared sensor, a radar sensor, or an ultrasound sensor.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 2:
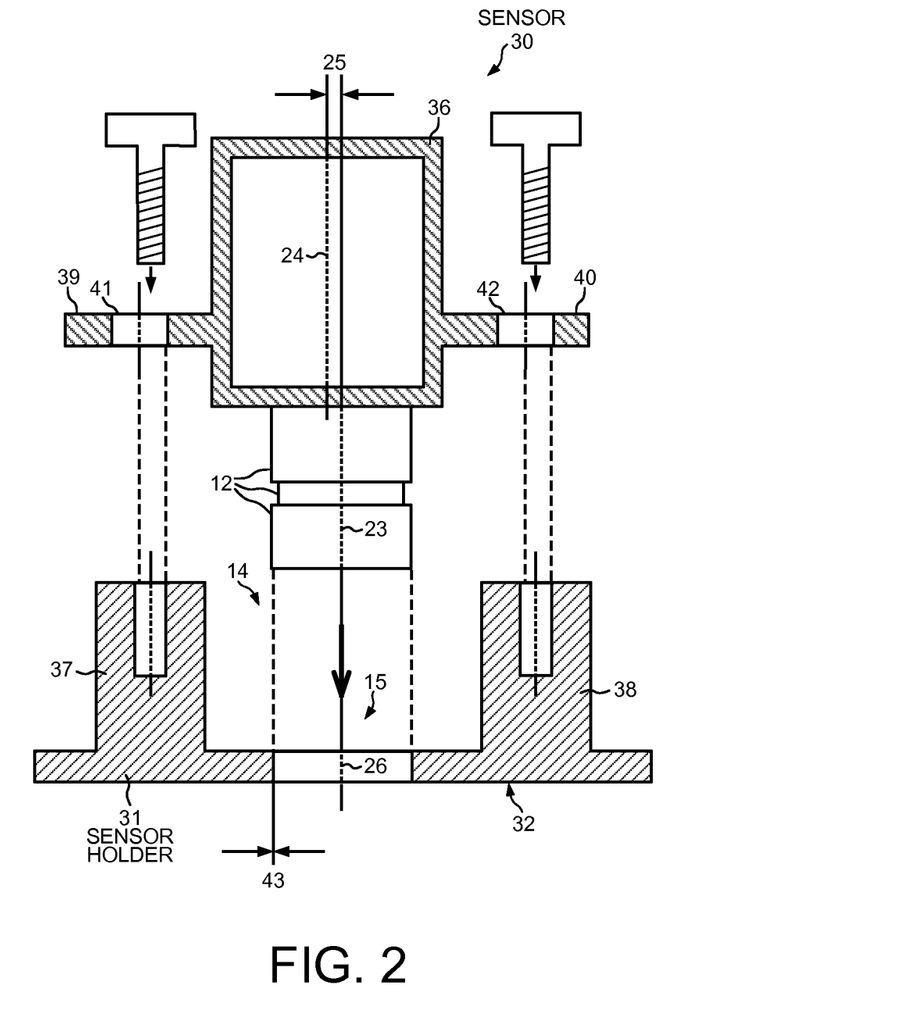
FIG. 2 is an exploded view of a first embodiment of the invention.

FIG. 2 shows a sensor arrangement according to a first embodiment in which the sensor axis 23 and the sensor holding axis 26 are aligned in the mounted state of the sensor 30 in the sensor holder 31.

The sensor axis 23 passes through the center of the sensor head 12, and the sensor holding axis 26 passes through the center of the sensor head opening 15. The sensor 30 fits into the sensor head receiver niche 14. By forming the sensor head receiver niche 14 so that the sensor axis 23 and the sensor holding axis 26 are aligned, a joint gap with a constant gap width is achieved between the margin of the sensor head opening 15 and the sensor head 12. Variations in the gap width, which are perceived as visually unappealing, are prevented, and the visual quality of the component group is improved. A constant gap width also decreases wind noises and soiling in the interior area of the sensor holder 31. In spite of the constant gap width, however, it does not become more difficult to mount the sensor 30 in the sensor holder 31. The outside surface 32 of the sensor holder 31 is preferably designed as a visible component. Alternatively, an additional transparent cover is also possible. The fastening means can include one or more screws, clamps and the like.

The sensor head 12 is preferably secured in the sensor head opening 15. This is achieved either by a clamping seat of the sensor head 12 in the sensor head opening 15 or by a peripheral collar on the sensor head, which rests on the sensor holder 31. The sensor head opening 15 is surrounded by a cover 33 with a cover opening 34. The sensor head 12 protrudes through the sensor head opening 15 and into the cover opening 34. As a result, the gap width between the sensor head 12 and the margin of the cover opening 34 that is visible from the outside can be set based on external specifications.

By providing the centering means on the sensor head 12 and the sensor head receiver niche 14, it is reliably ensured that the sensor axis 23 and the sensor holding axis 26 are aligned with one another. The manufacturing tolerances between the main body center axis 24 and the sensor axis 23 are compensated by appropriate dimensioning of the fastening means in a manner that is not visible from the outside. The sensor 30 and the sensor holder 31 can be attached to or integrated into a holding arm 35.

The gap width between the sensor head 12 and the opening 15 in the sensor holder 31 can be adapted to external requirements. In addition, the distance of the gap that has a predefined gap width is increased and is thereby made visually more apparent. The sensor holder 31, the holding arm 35 and/or the holding arm cover can be used as a cooling body for the sensor 30.

Fogging up of the sensor surface that is accessible only from the outside is prevented. This is particularly important in the case of cameras and their lenses. Indirect viewing is enabled with mirror-substitute cameras in order to detect legally required fields of vision. Here, the sensor axis 23 is the optical axis of the camera lens. Undesired reflections in the sensor are avoided or reduced by applying a matte coating to the outside surface of the sensor holder 31. The sensor arrangement preferably can be integrated into components such as indicator lamps, exterior mirrors and the like, which are already mounted outside the vehicle.

FIG. 2 is a cross-sectional, exploded view of the first embodiment of the sensor arrangement. The sensor arrangement includes the sensor 30 with a sensor main body 36 from which the sensor head 12 protrudes. The sensor 30 is held in the sensor holder 31. The sensor holder 31 includes the sensor head receiver niche 14 with the sensor head opening 15 and two screw receivers 37 and 38, which are located on the left and on the right of the sensor head opening 15 and extend in a direction parallel to the sensor main body 36. The sensor main body 36 includes two fastening clips 39 and 40 that extend away on the left and on the right from the sensor main body 36. Each of the fastening clips 39, 40 has a screw hole 41, 42. The sensor 30 is inserted into the sensor holder 31, and the two fastening clips 39 and 40 come to rest on the upper ends of the two screw receivers 37 and 38. The sensor 30 and the sensor holder 31 are screwed together using screws or bolts. The height of the two screw receivers 37 and 38 is chosen so that the end of the sensor head 12 is aligned with the outside surface 32 of the sensor holder 31.

The sensor axis 23 passes through the center of the sensor head 12 of the sensor 30. The main body center axis 24 passes through the center of the sensor main body 36, which deviates or can deviate from the sensor axis 23 due to the manufacturing tolerance 25. The sensor holding axis 26 passes through the center of the sensor head opening 15 at the end of the sensor head receiver niche 14. In contrast to the prior art shown in FIG. 1, the orientation and mounting of the sensor 30 is carried out in such a manner that it is not the main body center axis 24 that is aligned with the sensor holding axis 26, but instead the sensor axis 23 that is aligned with the sensor holding axis 26. Therefore, in comparison with the prior art, the bore holes 41, 42 in the holding clips 39 and 40 have to be made slightly larger so that the manufacturing tolerance 25, i.e., the deviation between the main body center axis 24 and the sensor axis 23, can be compensated. By appropriately dimensioning the sensor head opening 15, a precisely defined gap width 43 results between the margin of the sensor head opening 15 and the sensor head 12. The gap width 43 can therefore be adapted to the requirements of the given site of application. The manufacturing tolerance 25 is no longer represented in the drawings in the embodiments described below for the sake of simplifying the representation.

Figure 3:
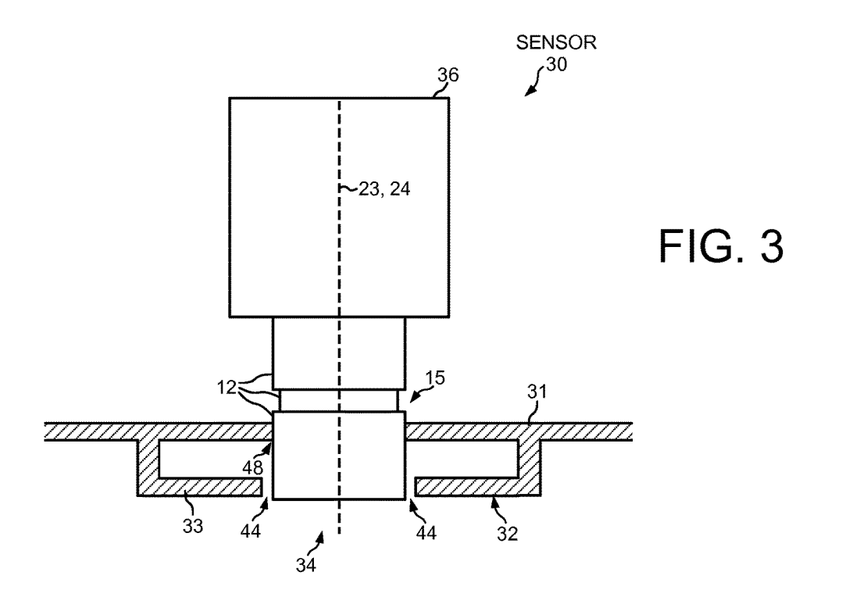
FIG. 3 is an exploded view of a second embodiment of the invention.

FIG. 3 shows a second embodiment that differs from the first embodiment of FIG. 2 in that the sensor head 12 protrudes past the sensor head opening 15 and in that the sensor head 12 is held in the sensor head opening 15 by press fitting. The sensor head opening 15 is surrounded by a cover 33 that includes a cover opening 34 into which the sensor head 12 protrudes. The free end of the sensor head 12 is aligned with the outside surface 32 of the cover 33. The distance from the margin of the cover opening 34 to the sensor head 12 can be adjusted to a desired gap width 44.

Figure 4:
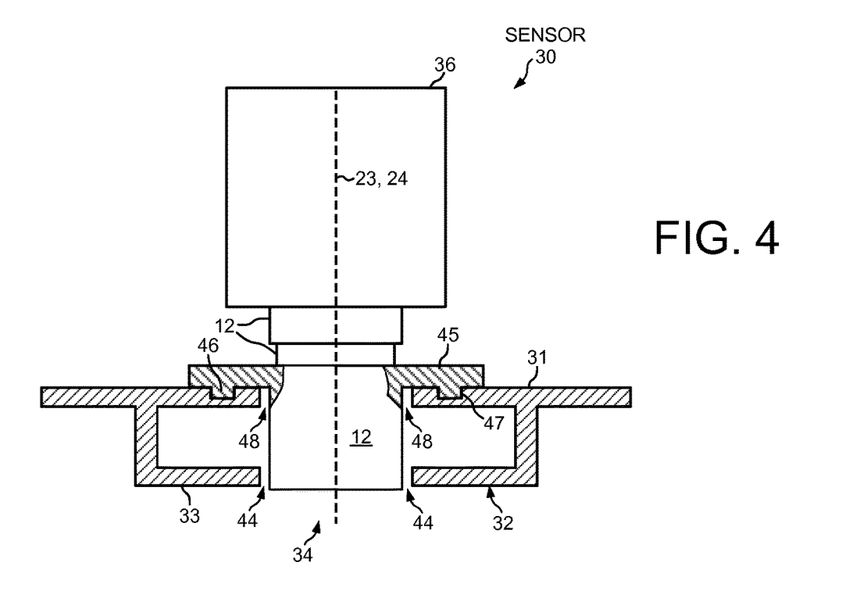
FIG. 4 shows a schematic diagram of a third embodiment of the invention.

FIG. 4 shows a third embodiment that differs from the embodiment of FIG. 3 only in that the sensor head 12 includes a peripheral sensor head collar 45. The peripheral sensor head collar 45 has a peripheral annular ridge 46 with a rectangular cross section that engages in a corresponding annular groove 47 on the inside surface of the sensor holder 31. The annular ridge 46 and annular groove 47 are a centering means that provide the desired orientation of the sensor axis 23 with the sensor holding axis 26.

Figure 5:
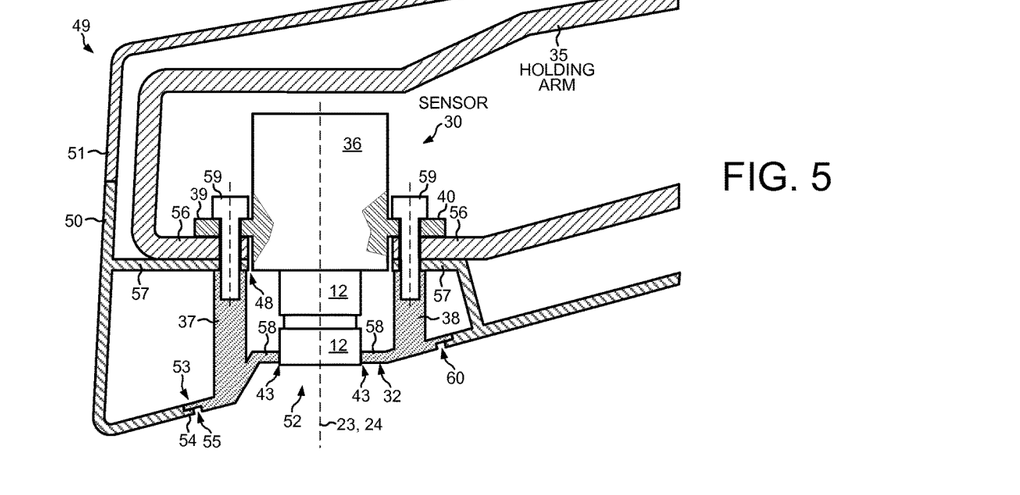
FIG. 5 shows a schematic diagram of a fourth embodiment of the invention.

FIG. 5 shows a fourth embodiment in which the sensor 30 and sensor holder 31 are mounted on a holding arm 35. In this manner, the sensor 30 can be mounted, for example, on the outside of a motor vehicle. The holding arm 35 is formed at least partially as a hollow profile and has a sensor opening 48 at the end 49 of the arm opposite the vehicle. The sensor opening 48 extends transversely to the longitudinal direction of the holding arm 35.

The holding arm 35 is covered by a first holding arm cover 50 and a second holding arm cover 51. The first holding arm cover 50 has a sensor holder opening 52 into which the sensor holder 31 is inserted.

The sensor holder 31 includes an annular peripheral, step-shaped collar 53 that engages with an overlap into a corresponding annular peripheral step 54 in the first holding arm cover 50. On the inside surface, the step-shaped collar 53 and the corresponding step 54 are put in contact, and on the outside surface they are spaced apart by a predefined gap width 55. Again, the gap width 55 can be adapted to external specifications.

The sensor opening 48 in the hollow area of the holding arm 35 is delimited by a flat margin section 56. Screw holes 41, 42 are provided in the margin section 56. An annular fastening collar 57 of the first holding arm cover 50 extends along the outside surface of the flat margin section 56 of the holding arm 35. The fastening collar 57 also has screw holes 41, 42. Within the annular collar 53, the left and right screw receivers 37 and 38 extend inward in the direction of the holding arm 35. Between the two screw receivers 37 and 38, the sensor head opening 15 opens in the middle of a flat margin section 58. The margin section 58 also has screw holes 41, 42. A left fastening clip 39 and a right fastening clip 40 extend away from the sensor main body 36 to the sides. The fastening clips 39 and 40 are associated with the left and right screw receivers 37 and 38. The two fastening clips 39 and 40 rest on the inner surface on the flat margin section 56.

Two fastening screws 59 first pass through the screw holes 41, 42 in the fastening clips 39 and 40, then through the screw holes in the flat margin section 56 of the holding arm 35, through the screw holes in the fastening collar 57 and finally engage in the screw receivers 37 and 38. As a result, the sensor 30, the sensor holder 31 and the first holding arm cover 50 are secured to one another and to the holding arm 35. The individual components are dimensioned so that the end of the sensor head 12 is approximately aligned with the outside surface 32 of the sensor head opening 15.

The sensor head 12 sits in the sensor head opening 15, resulting merely in a peripheral joint gap with gap width 43 between the margin of the sensor head opening 15 and the sensor head 12. The mating edge or overlap connection between the annular collar 53 and the complementary annular step 54 is designed so that an annular closed gap 60, which is visible from the outside surface 32, results with a predefined gap width 55.

The left side of the annular collar 53 protrudes past the end of the sensor head 12, while the right side of the annular collar 53 is slightly set back relative to the sensor head 12. As a result of this design, a visually constant impression is achieved, and the risk is decreased of soiling due to entry of foreign objects from the side.

Figure 6:
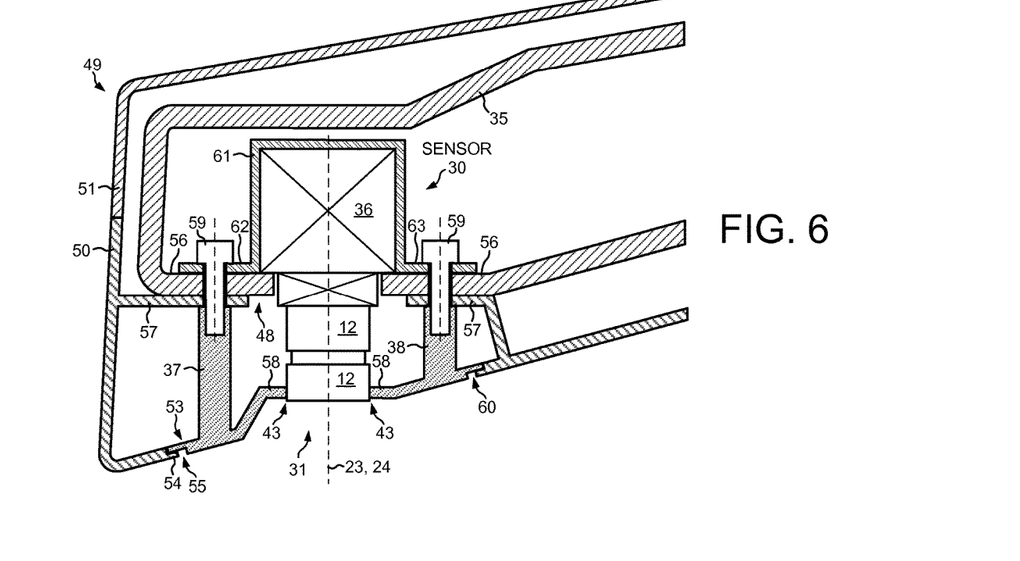
FIG. 6 is a cross-sectional diagram of a fifth embodiment of the invention.

FIG. 6 shows a fifth embodiment that differs from the embodiment of FIG. 5 in that the sensor main body 36 includes no fastening clips. The sensor opening 48 in the holding arm 35 is dimensioned so that the lower edge of the sensor main body 36 facing the sensor head 12 sits on the flat margin section 56. The end of the sensor main body 36 facing away from the sensor head 12 is covered by an upper holding cap or an upper holding bracket 61 from which the left and right fastening clips 62 and 63 extend away on the sides.

Figure 7:
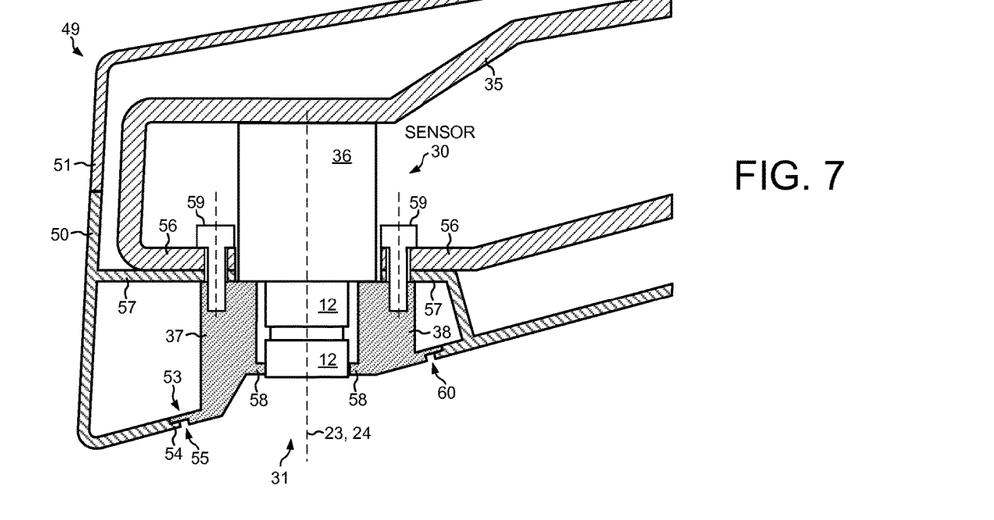
FIG. 7 is a cross-sectional diagram of a sixth embodiment of the invention.

FIG. 7 shows a sixth embodiment that differs from the embodiment of FIG. 6 in that the sensor main body 36 includes no fastening clips. The left and right screw receivers 37 and 38 have an inwardly broadening design so that the lower edge of the sensor main body 36 facing the sensor head 12 sits on the upper ends of the two screw receivers 37 and 38. The other end of sensor main body 36 facing away from the sensor head 12 contacts the inside surface of the holding arm 35 so that the sensor main body 36 and thus the sensor 30 are wedged in between the inside surface of the holding arm 35 and the upper surface of the two screw receivers 37 and 38. The fastening screws 59 pass through the screw holes 41, 42 in the flat margin section 56, through the screw holes in the annular fastening collar 57 and engage in the screw receivers 37 and 38.

Figure 8:
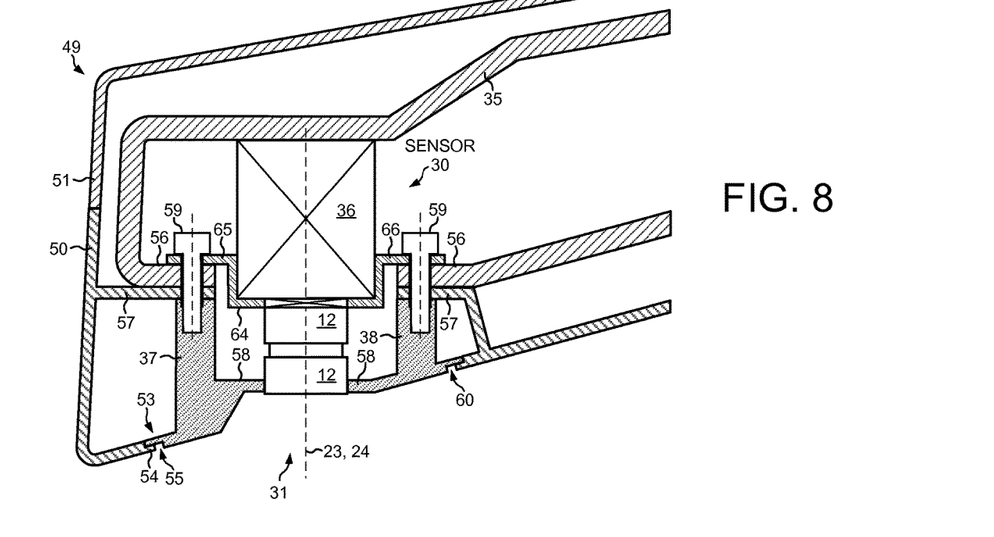
FIG. 8 is a cross-sectional diagram of a seventh embodiment of the invention.

FIG. 8 shows a seventh embodiment that differs from the embodiment of FIG. 7 in that the lower edge of the sensor main body 36 facing the sensor head 12 is not supported on broadened screw receivers 37 and 38. Instead, the lower surface of the sensor main body 36 facing the sensor head 12 is covered by a lower holding cap or lower holding bracket 64. On the side, the left and the right fastening clips 65 and 66 extend away from the lower holding cap 64. The sensor main body 36 and thus the sensor 30 are wedged in between the lower holding cap 64 and the inner surface of the holding arm 35 and secured to the holding arm 35.

Figure 9:
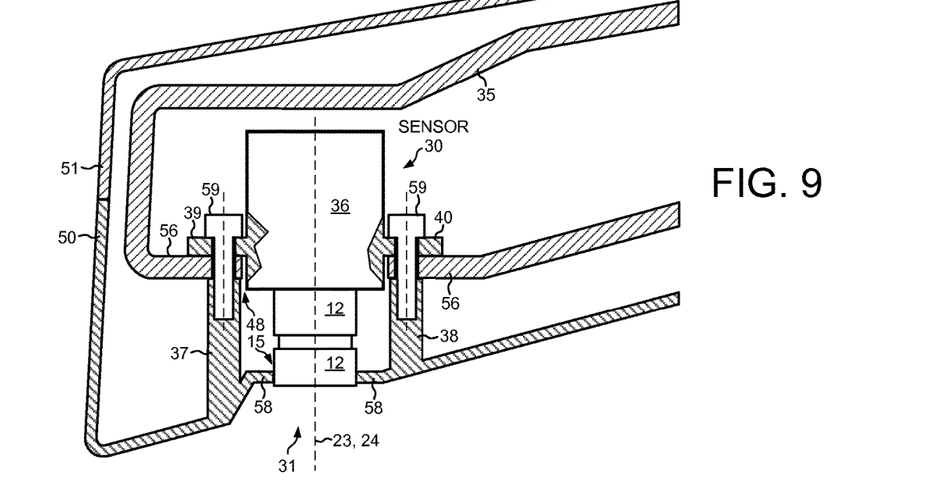
FIG. 9 is a cross-sectional diagram of an eighth embodiment of the invention.

FIG. 9 shows an eighth embodiment that differs from the embodiment of FIG. 5 in that the sensor holder 31 and the first holding arm cover 50 are formed as a single piece. As a result of this design, the fastening collar 57 provided in the embodiments of FIGS. 5-7 can be dispensed with. The fastening screws 59 pass through the screw holes in the fastening clips 39 and 40, through the screw holes 41, 42 in the flat margin section 56 and then engage in the two screw receivers of 37 and 38.

Figure 10:
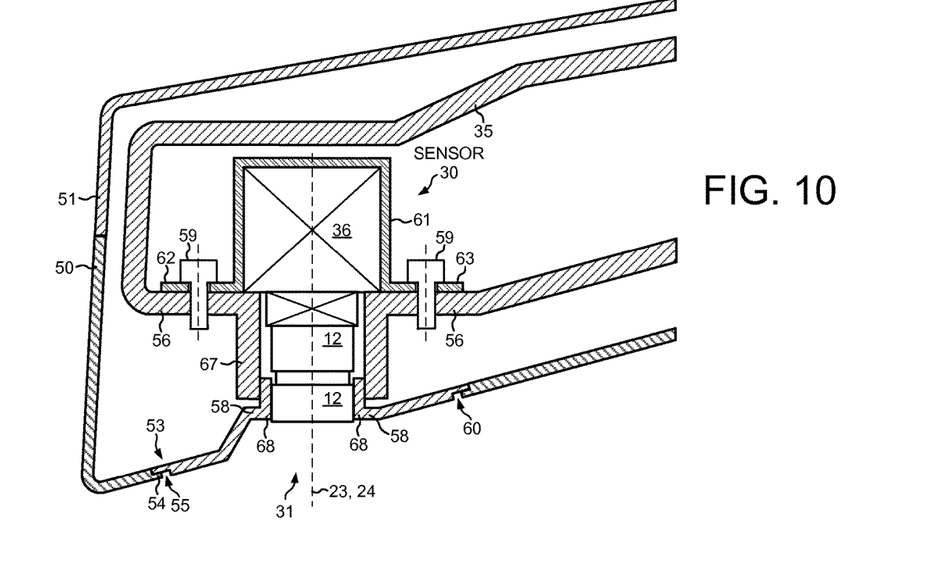
FIG. 10 is a cross-sectional diagram of a ninth embodiment of the invention.

FIG. 10 shows a ninth embodiment that differs from the preceding embodiments primarily in that the sensor holder 31 includes no screw receivers. The flat margin section 56 in the holding arm 35 is provided with a cylindrical attachment 67 that extends outward. In the same way, a cylindrical attachment 68 extends from the margin section 58 of the sensor holder 31 in the direction of the sensor main body 36. The outer diameter of the cylindrical attachment 68 corresponds to the inner diameter of the cylindrical attachment 67. The upper end of the cylindrical attachment 68 engages in the lower end of the cylindrical attachment 67, and the cylindrical attachment 68 is wedged in between the sensor head 12 and the cylindrical attachment 67. In the embodiments of FIGS. 10 and 6, the lower edge of the sensor main body 36 facing the sensor head 12 sits on the inner surface of the flat margin section 56. The surface of the sensor main body 36 facing away from the sensor head 12 is covered by an upper holder cap 61, from which the two fastening clips 62 and 63 extend away to the sides. The screw holes 41, 42 in the flat margin section 56 are provided with threads so that the fastening screws 59 pass through the screw holes 41, 42 in the fastening clips 62 and 63 and are secured in the threaded screw holes in the flat margin section 56.

Figure 11:
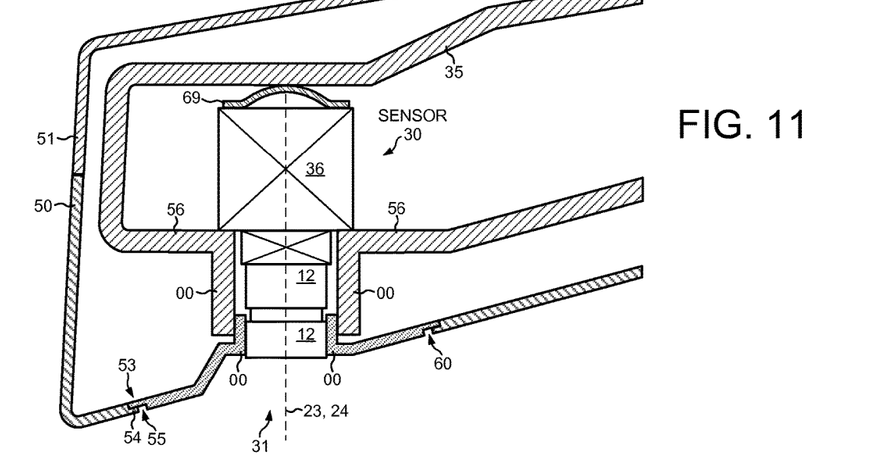
FIG. 11 is a cross-sectional diagram of a tenth embodiment of the invention.

FIG. 11 shows a tenth embodiment that differs from the embodiment of FIG. 10 in that the sensor main body 36 and thus the sensor 30 are wedged inside the holding arm 35. For this purpose, the sensor main body 36 again sits with the lower edge facing the sensor head 12 on the flat margin section 56. A spring element 69 is provided on the upper surface of the sensor main body 36 or on the surface of the sensor main body facing away from the sensor head 12. The spring element 69 presses against the inner surface of the holding arm 35 and secures the sensor main body 36 and thus the sensor 30 to the holding arm 35.

Figure 12:
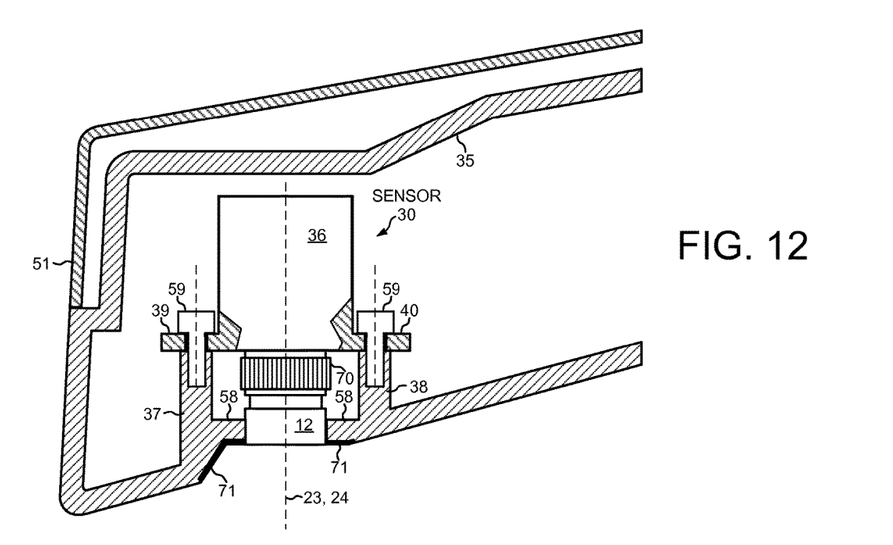
FIG. 12 is a cross-sectional diagram of an eleventh embodiment of the invention.

FIG. 12 shows an eleventh embodiment that differs from the preceding embodiments in that the holding arm 35 itself is designed as a sensor holder 31 and in that the sensor holder 31 is an integral component of the holding arm 35. The holding arm 35 is designed with a hollow profile at least in the area in which the sensor 30 is located. The holding arm 35 includes the sensor head opening 15. The sensor head 12 is fitted into the sensor head opening 15 with a minimal gap width 43. The fastening clips 39 and 40 extend away from the sensor main body 36 on the left and on the right. On the side, the left and the right screw receivers 37 and 38 extend away from the sensor head opening 15 inward in the direction of the sensor main body 36. Fastening screws 59 pass through the screw holes 41, 42 into the two fastening clips 39 and 40 and engage the two screw receivers 37 and 38, thus securing the sensor 30 in the holding arm 35.

The portion of the sensor head 12 located inside the holding arm 35 is enclosed annularly by a heating element 70. For example, the heating element 70 is a flexible heating foil that is wrapped around the sensor head 12 on the inside of the holding arm 35. Such heating foil can be obtained from the company Flextem GmbH in Bobenheim-Roxheim, Germany. This heating element 70 prevents condensate from precipitating on the side of the sensor 30 that is accessible from the outside. The heating element 70 can also be used with all the above-described embodiments.

In addition, the outside surface of the holding arm 35 has a matte implementation in the area of the sensor holder 31 or is provided with a matte coating 71 in order to prevent reflections towards the sensor. This is particularly important when the sensor 30 is a camera and the sensor head 12 is the lens of a camera. The coating 71 can naturally also be provided in all of the other above-described embodiments.

To the extent that screw receivers are provided in the above-described embodiments, reference is always made to two screw receivers. Of course, it is also possible to provide only one screw receiver or more than two screw receivers.

In the above-described embodiments, the sensor head 12 is inserted snuggly into the sensor head opening 15 in the sensor holder 31. The sensor head 12 can also be inserted through force fitting or press fitting into the sensor head opening 15.

LIST OF REFERENCE NUMERALS 10 prior art sensor
11 sensor main body
12 sensor head
13 sensor holder
14 sensor head receiver niche
15 sensor head opening
16 left screw receiver
17 right screw receiver
18 left fastening clip
19 right fastening clip
20 screw hole
21 screw hole
22 outside surface of sensor holder
23 sensor axis
24 main body center axis
25 manufacturing tolerance, deviation between sensor axis and main body center axis
26 sensor holding axis
27 gap width
28 gap width
30 sensor
31 sensor holder
32 outside surface of sensor holder
33 cover
34 cover opening
35 holding arm
36 sensor main body
37 left screw receiver
38 right screw receiver
39 left fastening clip
40 right fastening clip
41 left screw hole
42 right screw hole
43 gap width
44 gap width
45 sensor head collar
46 annular ridge
47 annular groove
48 sensor opening in arm
49 end of arm away from vehicle
50 first holding arm cover
51 second holding arm cover
52 sensor holder opening in holding arm cover 53 annular, step-shaped collar on sensor holder
54 step in arm cover
55 gap width
56 flat margin section around sensor opening
57 annular fastening collar on arm cover
58 flat margin section around sensor head
59 fastening screws
60 annular gap around sensor holder
61 upper holding cap or upper holding bracket
62 left fastening clip
63 right fastening clip
64 lower holding cap or lower holding bracket
65 left fastening clip
66 right fastening clip
67 cylindrical attachment on collar
68 cylindrical attachment on flat margin section
69 spring element
70 heating element
71 coating Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A device for monitoring the surroundings of a vehicle, comprising:
   a sensor that includes a sensor main body and a sensor head, wherein a sensor axis passes through the center of the sensor head and a main body center axis passes through the center of the sensor main body, and wherein the sensor axis deviates from the main body center axis;
   a sensor holder that includes a sensor head receiver niche and a sensor head opening into which the sensor head is received, wherein a sensor holding axis passes through the center of the sensor head opening; and
   a fastener that fastens the sensor to the sensor holder, wherein the sensor head receiver niche is formed so that when the sensor is mounted in the sensor holder the sensor holding axis and the sensor axis are colinear, and wherein the fastener compensates for the sensor axis deviating from the main body central axis.

2. The device of claim 1, wherein the sensor head includes a sensor head collar, and wherein the sensor head collar rests on the sensor holder so as to align the sensor axis with the sensor holding axis.

3. The device of claim 2, wherein the sensor head collar has an annular ridge that fits in an annular groove in the sensor holder.

4. The device of claim 1, wherein the sensor head protrudes past the sensor head opening, wherein the sensor head opening is surrounded by a cover with a cover opening, wherein the sensor head passes into the cover opening, and wherein a predefined gap width between the sensor head and the cover opening is greater than a constant gap width between the sensor head and the sensor head opening.

5. The device of claim 1, wherein the sensor is a camera, and the sensor head is a camera lens.

6. The device of claim 1, wherein the sensor is taken from the group consisting of: a thermal imaging camera, an infrared sensor, a radar sensor, and an ultrasound sensor.

7. The device of claim 1, wherein the sensor holder has an outside surface with a matte coating around the sensor head opening.

8. The device of claim 1, wherein the sensor holder is integrated into a holding arm of a turn indicator lamp of the vehicle.

9. A device for monitoring the surroundings of a vehicle, comprising:
   a sensor that includes a sensor main body and a sensor head, wherein a sensor axis passes through the center of the sensor head and a main body center axis passes through the center of the sensor main body, and wherein the sensor axis deviates from the main body center axis;
   a sensor holder that includes a sensor head receiver niche and a sensor head opening into which the sensor head is received, wherein a sensor holding axis passes through the center of the sensor head opening; and
   a fastener that fastens the sensor to the sensor holder, wherein the sensor head receiver niche is formed so that when the sensor is mounted in the sensor holder the sensor holding axis and the sensor axis are aligned, wherein the fastener compensates for the sensor axis deviating from the main body central axis, wherein the fastener includes bore holes in holding clips attached to the sensor, wherein screws pass through the bore holes and into screw holes in the sensor holder, and wherein the bore holes have a larger diameter than do the screw holes.

10. The device of claim 9, wherein the screws hold the sensor head centered in the sensor head opening.

11. A device for monitoring the surroundings of a vehicle, comprising:
   a sensor that includes a sensor main body and a sensor head, wherein a sensor axis passes through the center of the sensor head and a main body center axis passes through the center of the sensor main body, and wherein the sensor axis deviates from the main body center axis;
   a sensor holder that includes a sensor head receiver niche and a sensor head opening into which the sensor head is received, wherein a sensor holding axis passes through the center of the sensor head opening; and
   a fastener that fastens the sensor to the sensor holder, wherein the sensor head receiver niche is formed so that when the sensor is mounted in the sensor holder the sensor holding axis and the sensor axis are aligned, wherein the fastener compensates for the sensor axis deviating from the main body central axis, and wherein the sensor and the sensor holder are integrated into a holding arm that is attached to the vehicle.

12. The device of claim 11, wherein the sensor holder and the holding arm are integrally formed as a single piece.

13. The device of claim 11, wherein the sensor holder is attached to the holding arm by an annular collar of the sensor holder that mates with a complementary annular step of the holding arm.

14. The device of claim 11, wherein a flexible heating foil is wrapped around the sensor head inside the holding arm.

15. A device comprising:
   a sensor that includes a sensor main body and a cylindrical sensor head, wherein a sensor axis passes through the center of the sensor head and a main body center axis passes through the center of the sensor main body, and wherein the sensor axis deviates from the main body center axis;
   a sensor holder that includes a circular sensor head opening into which the sensor head passes, wherein a sensor holding axis passes through the center of the sensor head opening; and a fastener that attaches the sensor to the sensor holder such that the sensor holding axis and the sensor axis are aligned, wherein the fastener compensates for the sensor axis deviating from the main body central axis by centering the sensor head in the sensor head opening, wherein bore holes are disposed in the fastener, wherein screws pass through the bore holes and into screw holes in the sensor holder, and wherein the bore holes have a larger diameter than do the screw holes.

16. The device of claim 15, wherein the sensor holder is integrated into a holding arm that is attached to a vehicle.

17. The device of claim 15, wherein the sensor is taken from the group consisting of: a thermal imaging camera, an infrared sensor, a radar sensor, and an ultrasound sensor.

18. A device comprising:
a sensor that includes a sensor main body and a cylindrical sensor head, wherein a sensor axis passes through the center of the sensor head and a main body center axis passes through the center of the sensor main body, and wherein the sensor axis deviates from the main body center axis;

a sensor holder that includes a circular sensor head opening into which the sensor head passes, wherein a sensor holding axis passes through the center of the sensor head opening; and a fastener that attaches the sensor to the sensor holder such that the sensor holding axis and the sensor axis are aligned, wherein the fastener compensates for the sensor axis deviating from the main body central axis by centering the sensor head in the sensor head opening, wherein the sensor holder is attached to a holding arm that is attached to a vehicle, and wherein the sensor holder is oriented with the holding arm by an annular ridge of the sensor holder that mates with a complementary annular groove of the holding arm.

* * * * *